April 15, 1958     A. B. TAYLOR     2,831,071
EXPANSION JOINT FOR ELECTRICAL TROLLEY SYSTEM
Filed Dec. 8, 1953
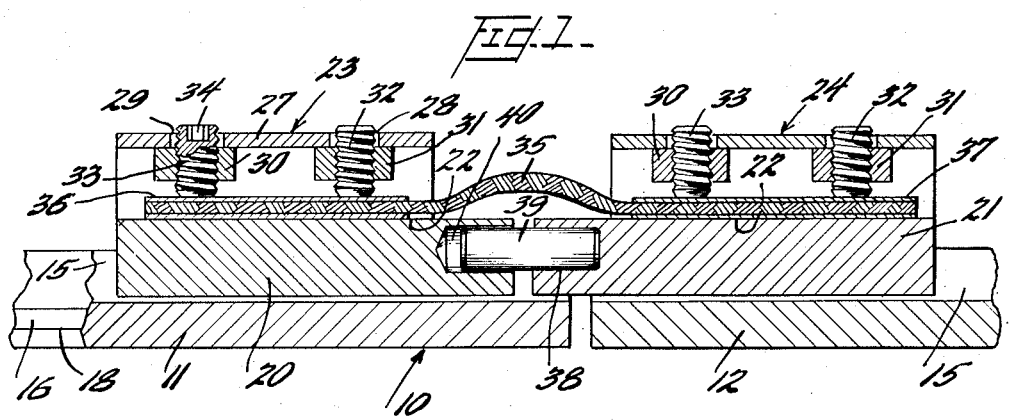
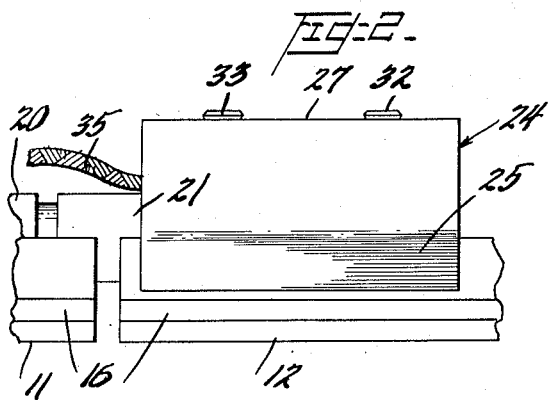
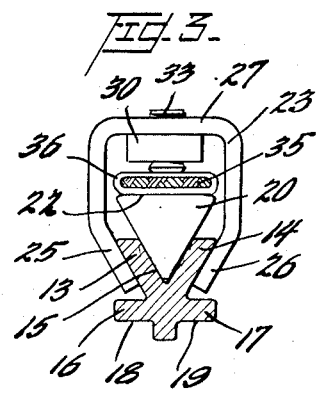
INVENTOR.
Ashton B. Taylor,
BY Smith, Michael & Gardiner
Attorneys

United States Patent Office 2,831,071
Patented Apr. 15, 1958

2,831,071

EXPANSION JOINT FOR ELECTRICAL TROLLEY SYSTEM

Ashton B. Taylor, Pittsburgh, Pa.

Application December 8, 1953, Serial No. 396,924

3 Claims. (Cl. 191—44.1)

This invention relates to an expansion joint and is more particularly directed to expansion joints for use in connection with electrical trolley systems such as are used for monorails, tramways, cranes, and other industrial installations in which electrical energy is to be transmitted from a conducting bus bar to mobile units movable along said bus bar.

In systems of the type herein contemplated, the conductor bus bar is relatively rigid so that it cannot be coiled like wire and therefore must be hung in sections when in use. Consequently, where long runs are necessary a number of such sections must be hung in end-to-end relation throughout the length of the bus bar track.

It is essential that adjacent ends of the bus bar be in alignment for smooth and satisfactory operation. It is also imperative that provision be made for expansion and contraction of the bus bar due to temperature or other changes, and provision must also be made for carrying current from section to section throughout the length of the conductor bus bar.

The present invention is designed to carry out the above requirements and is an economical, efficient, and dependable manner by means which may be quickly and easily installed without employing highly trained or skilled mechanics.

An object of the present invention is to provide a conductor bus bar of special design which is rigid in character and with which a collector shoe is adapted to cooperate, such bus bar being easily hung in sections to provide a track of any desired length.

Another object is to provide means for insuring and maintaining perfect alignment between the sections throughout the length of the bus bar, while at the same time permitting the sections to have movement one relative to the other due to contraction and expansion caused by changes in climatic conditions.

A further object is to provide means for carrying electrical current from section to section across the joints even though such sections are movable relative to each other.

Other objects and advantages will clearly appear as the description proceeds, it being understood that while the preferred form is here shown, changes and modifications may be resorted to so long as they fall within the spirit and scope of the appended claims.

Referring to the drawings, forming part hereof, and wherein like numerals refer to like parts throughout the views, Fig. 1 is a fragmentary, longitudinal, sectional view of the invention, Fig. 2 is a fragmentary, side elevation, and Fig. 3 is an end view with the conductor bus bar and shunt wire being shown in transverse section.

Referring more particularly to the drawings, there is illustrated a conductor bus bar 10 shown as consisting of sections 11 and 12, but of course any number of similar sections may be employed.

Bus bar 10 is connected by any suitable means to a source of electrical current, and provision is made for carrying the current from section to section of said bus bar. Each section of bus bar 10 is shaped as shown in Fig. 3, wherein a section consists of converging arms 13 and 14 forming therebetween a V-shaped trough 15. Extending horizontally on opposite sides of the arms at approximately the juncture therebetween are wings 16 and 17 provided at their lower faces with flat contact surfaces 18 and 19 with which a collector shoe is adapted to cooperate.

Intermediate the ends of the wings 16 and 17 a downwardly extending rib is provided, and while this rib is essential when used with a collector shoe of the type shown in application Serial No. 395,950, filed December 3, 1953, it is not essential to the present invention.

The bus sections are held in vertical and horizontal alignment by conducting blocks 20 and 21 which are triangular in cross section with two of their walls conforming to the shape of the trough 15 in the bus bar sections, while the third wall forms a flat contact surface 22. The blocks 21 and 22 are forcibly urged against the bus bar sections, and as seen in Fig. 1, the space between the blocks is staggered or offset longitudinally from the joint between the bus bar sections so that one of the blocks extends across said joint. By this construction it is obvious that due to the mating surfaces between the blocks and the bus bar sections and the overlapping of the bus bar joint by one of the blocks, the bus bar sections are brought into and maintained in perfect alignment both vertically and horizontally when properly installed.

As stated, the conducting blocks 20 and 21 are forcibly urged into engagement with the bus bar sections, and this is accomplished by means of channel-shaped clips 23 and 24, one of which engages the bus bar adjacent the joint therebetween. The clips 23 and 24 straddle their respective bus bar sections and are provided at the free edges of the channel with converging ends 25 and 26 conforming in shape with the outer walls of the arms 13 and 14.

The web 27 of clip 23 lies above the conducting blocks 20 and 21 and is provided with spaced openings 28 and 29. Beneath these openings are nuts 30 and 31 welded or otherwise secured to the lower face of the web with their threaded bores in registry with the openings for the reception of screws 32 and 33. These screws project through the openings 28 and 29 where they are available for turning as by means of sockets such as 34. Clip 24 is of the same construction and is mounted in the same manner so that no further description is necessary.

By the construction thus far described, it is apparent that the bus bar sections and conducting blocks are free to move longitudinally toward and away from each other, but since electrical current must be supplied to the sections, some electrical connection must be provided which will accomplish this purpose during such contraction and expansion.

The blocks 20 and 21 are provided with flat, upper surfaces as described, and the screws 32 and 33 lie above these surfaces. The electrical connection between the bus sections is provided for by a flat, flexible shunt 35 here shown as being of braided copper in the form of a tape. The opposite ends of the tapes are bound by metallic sleeves 36 and 37, and these sleeves are placed on the flat surfaces of the blocks 20 and 21, respectively, and beneath the screws, so that tightening the screws not only forces the shunt into contact with the blocks, but also forces the blocks into intimate engagement with the bus bar while at the same time clamping the bus bar between the blocks and the converging ends 25 and 26 of the clip 23.

The shunt 35 as shown in Fig. 1 is flexible intermediate the sleeves 36 and 37, so that it is free to bow under the contractive and expansive forces of the bus bar, and since it extends across the joint between the bus bar sections, current will be transmitted from section to section throughout the bus bar.

In order further to insure alignment between sections, one of the conducting blocks, such as 21, is provided with a horizontal bore 38 snugly receiving a guide pin 39 which projects from the end of the block. The other block, such as 20, is also provided with an aligned bore 40 which is slightly larger than the diameter of the guide pin and receives the end of the pin 39 so that the pin is free to slide therein as the blocks move toward and away from each other. Of course, the pin and socket arrangement is present at each joint, and their positions may be reversed without changing the operation whatever.

In installing the trolley system of the present invention, the bus bar sections are hung in any suitable manner and with their adjacent ends approximately in alignment. The conducting blocks 20 and 21 are placed in the trough 15 of the bus bar so that the joint between blocks is offset from the joint between bus bar sections, thereby causing one of the blocks to overlap the bus bar joint and with the pin 39 slidably received in the socket 40.

The clips 23 and 24 are then slid over their respective conducting blocks with the screws 32 and 33 retracted, after which the shunt is positioned as shown in Fig. 1, with the sleeves 36 and 37 lying beneath the screws. Now by turning the screws 32 and 33, the shunt 35 is forced into firm engagement with the conductor blocks 20 and 21. The blocks in turn are forced firmly into the trough 15 of the bus bar, and due to the reaction on the clips 23 and 24, the arms 13 and 14 of the bus bar are rigidly clamped between the clips and conducting blocks and are held so that perfect alignment of the bus bar sections is accomplished, even during contraction and expansion of the bus bar.

From the foregoing, it will be seen that the expansion joint of the present invention provides for accurate alignment of the bus bar sections both vertically and horizontally and for the maintenance of such condition throughout the life of the trolley system. Secondly, the joint effectively permits expansion and contraction of the bus bar to take place without effect on the alignment of the sections. Thirdly, electrical current is transmitted from section to section without loss and during contraction and expansion of the bus bar, and all of the foregoing advantages are obtained in a simple, efficient, and inexpensive manner, so that the system may be installed quickly and easily by any ordinary mechanic without the use of special tools or equipment.

I claim:

1. An expansion joint for electrical trolley systems comprising a bus bar consisting of sections arranged in end-to-end relation, the upper faces of said blocks being provided with a V-shaped groove extending longitudinally thereof, spaced conducting blocks of triangular shape lying within said groove at adjacent ends of said sections with two of the walls of each block engaging the walls of the V-shaped groove, the other walls of said blocks presenting flat contact surfaces, the space between said blocks being offset relative to the joints of the bus sections whereby one of said blocks overlaps the bus section joints, a flexible shunt connecting said conducting blocks and spanning the joint therebetween, the ends of said shunt engaging said flat contact surfaces, and means engaging the ends of said shunt to force said shunt into engagement with the conducting blocks and simultaneously force the blocks into engagement with their respective bus sections.

2. An expansion joint for electrical trolley systems comprising a bus bar consisting of sections arranged in end-to-end relation, spaced conductor blocks engaging adjacent ends of said sections with one of said blocks spanning the space between bus bar sections, a flexible shunt lying on said conductor blocks and connecting said blocks across the bus section joints, and means for frictional connecting said shunt to said block and simultaneously forcing the blocks into frictional engagement with said bus sections, said means comprising clips engaging adjacent ends of said bus sections and encircling the ends of the conducting blocks and shunt, and screws carried by said clips and engaging the ends of the shunt for forcing the shunt and blocks toward the bus bar sections.

3. An expansion joint for electrical trolley systems comprising a bus bar consisting of sections arranged end-to-end, said bus bar sections having downwardly converging arms forming V-shaped grooves therebetween and extending longitudinally of each section, spaced triangular conducting blocks fitted into and mating with said grooves at adjacent ends of the sections, a shunt extending across the space between blocks and having its ends lying on said triangular blocks, clips at adjacent ends of said sections surrounding said blocks and shunt ends, said clips having converging arms mating with and contacting the outer surfaces of said converging arms on the bus sections, and screw means threaded through said clips and engaging said shunt ends to clamp the same and said blocks against the bus sections, the converging arms on said bus section maintaining the sections against movement during such clamping action.

References Cited in the file of this patent

UNITED STATES PATENTS

| | | |
|---|---|---|
| 367,956 | Brewer | Aug. 9, 1887 |
| 1,099,390 | Mulligan | June 9, 1914 |
| 1,350,856 | Davis | Aug. 24, 1920 |
| 2,434,604 | West | Jan. 13, 1948 |

FOREIGN PATENTS

| | | |
|---|---|---|
| 885,140 | France | May 17, 1943 |